United States Patent [19]

Klein

[11] Patent Number: 4,648,989

[45] Date of Patent: Mar. 10, 1987

[54] UNDERWATER COMPRESSING AND CUTTING APPARATUS

[75] Inventor: William J. Klein, Wayne, N.J.

[73] Assignee: Wastechem Corporation, Paramus, N.J.

[21] Appl. No.: 706,046

[22] Filed: Feb. 27, 1985

[51] Int. Cl.[4] .......................... G21F 9/34; B23P 19/00; G21C 19/36

[52] U.S. Cl. .................................. 252/626; 29/426.1; 29/426.2; 29/723; 83/19; 83/54; 100/39; 252/627; 376/261; 376/262

[58] Field of Search ........................ 252/626, 627, 633; 29/419 R, 426.2, 426.3, 723; 376/272, 261–263; 414/404, 146, 745, 746; 83/19, 618, 23, 54; 100/39

[56] References Cited

U.S. PATENT DOCUMENTS

| 3,763,770 | 10/1973 | Ehrman et al. | 100/39 |
|---|---|---|---|
| 4,186,657 | 2/1980 | Weil et al. | 100/39 |
| 4,223,581 | 9/1980 | Markiewicz | 252/626 |
| 4,290,906 | 9/1981 | Saito et al. | 252/626 |
| 4,377,551 | 3/1983 | Adams | 252/627 |
| 4,434,092 | 2/1984 | Mary | 252/627 |
| 4,441,242 | 4/1984 | Hicken et al. | 376/272 |
| 4,446,098 | 5/1984 | Pomaibo et al. | 376/272 |
| 4,511,499 | 4/1985 | Meuschke et al. | 376/272 |
| 4,537,711 | 8/1985 | Wilhelm et al. | 252/626 |
| 4,547,117 | 10/1985 | Shields et al. | 376/272 |

FOREIGN PATENT DOCUMENTS

| 7703722 | 2/1977 | Fed. Rep. of Germany . | |
| 2139804 | 11/1984 | United Kingdom | 252/626 |

Primary Examiner—Stephen J. Lechert, Jr.
Assistant Examiner—Howard J. Locker
Attorney, Agent, or Firm—Felfe & Lynch

[57] ABSTRACT

An underwater compressing and cutting apparatus for activated or contaminated components of the core of a nuclear reactor by means of which even components of different geometry and different properties can be compressed to reduce their bulk and cut. The apparatus comprises a frame and slidable sleds, one sled having a squeezing jaw and the other sled having a chopping knife which are operated by unidirectional hydraulic cylinders.

14 Claims, 10 Drawing Figures

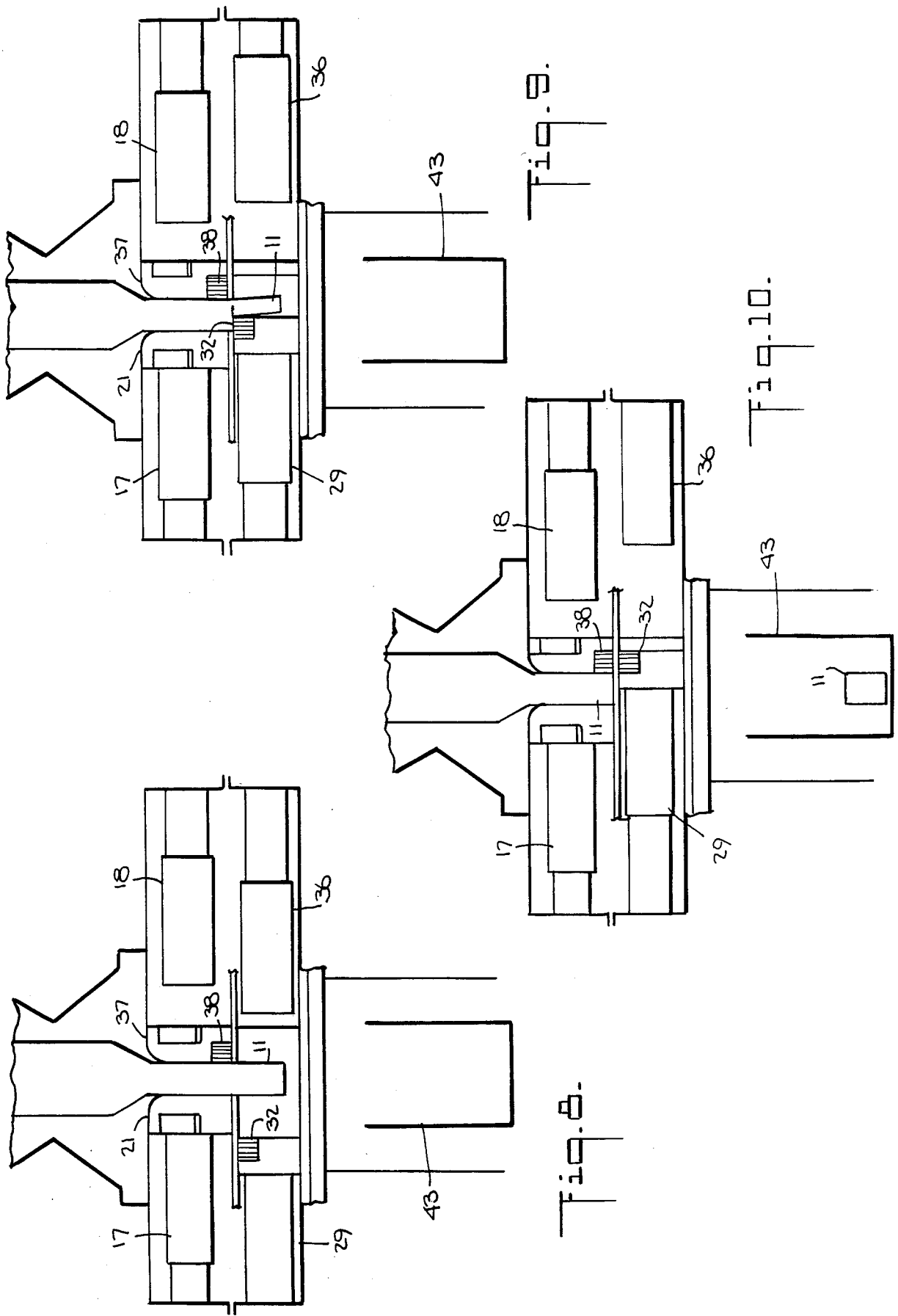

UNDERWATER COMPRESSING AND CUTTING APPARATUS

This invention relates to an underwater compressing and cutting apparatus for activated or contaminated components of the cores of nuclear reactors, such as poison curtains, in-core-wires, control rods, fuel channels, fuel assembly skeletons and the like, preferably comprising a compacting and cutting unit which is attached to a frame.

Activated or contaminated components of the cores of nuclear reactors may be cut up to reduce their bulk before they can be further conditioned and stored. The bulk-reducing cutting up of such components, such as poison curtains, in-core-wires, control rods, fuel channels, fuel assembly skeletons etc., is performed under water for reasons of safety.

In German Gebrauchsmuster No. 7703722 there is described an installation in which such core components can be compacted and chopped up. The disadvantage of that installation is that the chopped pieces of the components may often expand resiliently, thus again bringing about an undesired bulk increase. The causes of this are different combinations of material in the components, geometrical differences, twisting, and above all a varying state of embrittlement caused by the varying neutron flux to which the components are exposed during operation of the reactor. This results in additional high friction forces which have to be withstood by the apparatus, and also lubrication problems, from the standpoint of avoiding pollution of the pool water.

The invention is, therefore, addressed to the problem of creating an underwater compressing and cutting apparatus for activated or contaminated components of the cores of nuclear reactors, for example, poison curtains, in-core-wires, control rods, fuel channels, fuel assembly skeletons and the like, preferably comprising a compacting and cutting unit, which is attached to a frame, whereby the components of varying geometry and different properties can be chopped up safely and in a bulk-reducing manner with minimized spring-back after compressing and cutting.

It is an object of the present invention, therefore, to provide a new and improved underwater compressing and cutting apparatus for activated or contaminated components of the core of a nuclear reactor, which avoids one or more of the above mentioned disadvantages of prior such apparatus.

It is another object of the invention to provide a new and improved compressing and cutting apparatus for activated or contaminated components of the core of a nuclear reactor, which is of rugged design having strength and simplicity of construction and which requires little or no maintenance.

It is another object of the invention to provide a new and improved underwater compressing and cutting apparatus for activated or contaminated components of the core of a nuclear reactor, having a minimum number of moving parts and no rolling contacts.

It is another object of the invention to provide a new and improved underwater compressing and cutting apparatus for activated or contaminated components of the core of a nuclear reactor which can be readily dismantled and cleaned.

It is another object of the invention to provide a new and improved compressing and cutting apparatus for activated or contaminated components of the core of a nuclear reactor, which minimizes spring-back of the components after compressing and cutting.

It is another object of the invention to provide a new and improved underwater compressing and cutting apparatus for activated or contaminated components of the core of a nuclear reactor, in which the compressing or crushing members retain elastic memory after exposure to radiation.

In accordance with the invention, underwater compressing and cutting apparatus for activated or contaminated components of the core of a nuclear reactor comprises a frame and first squeezing means attached to the frame. The apparatus also includes first controllable displacing means attached to the frame. The apparatus also includes a first assembly that is movable by the controllable displacing means and comprises second squeezing means and means supporting the second squeezing means and slidable on the frame and having vertically extending, horizontally spaced sliding means joined by transversely extending means. The transversely extending means is displaceable by the controllable displacing means for displacing the slidable means and the second squeezing means together in two directions on the frame to compress and release the core components. The apparatus also includes second controllable displacing means attached to the frame. The apparatus also includes a second assembly which is separately movable by the second controllable displacing means. The second assembly comprises a knife and means supporting the knife slidable on the frame and having vertically extending, horizontally spaced sliding means joined by transversely extending means. The transversely extending means of the second assembly is displaceable by the second controllable displacing means for displacing the second slidable means and the knife together in two directions on the frame to cut the core components.

For a better understanding of the present invention, together with other and further objects thereof, reference is made to the following description, taken in connection with the accompanying drawings, and its scope will be pointed out in the appended claims.

Referring now to the drawings:

FIGS. 7-10, inclusive, are schematic, diagrammatic representations of the FIG. 1 apparatus in various operating conditions.

Figure 1:
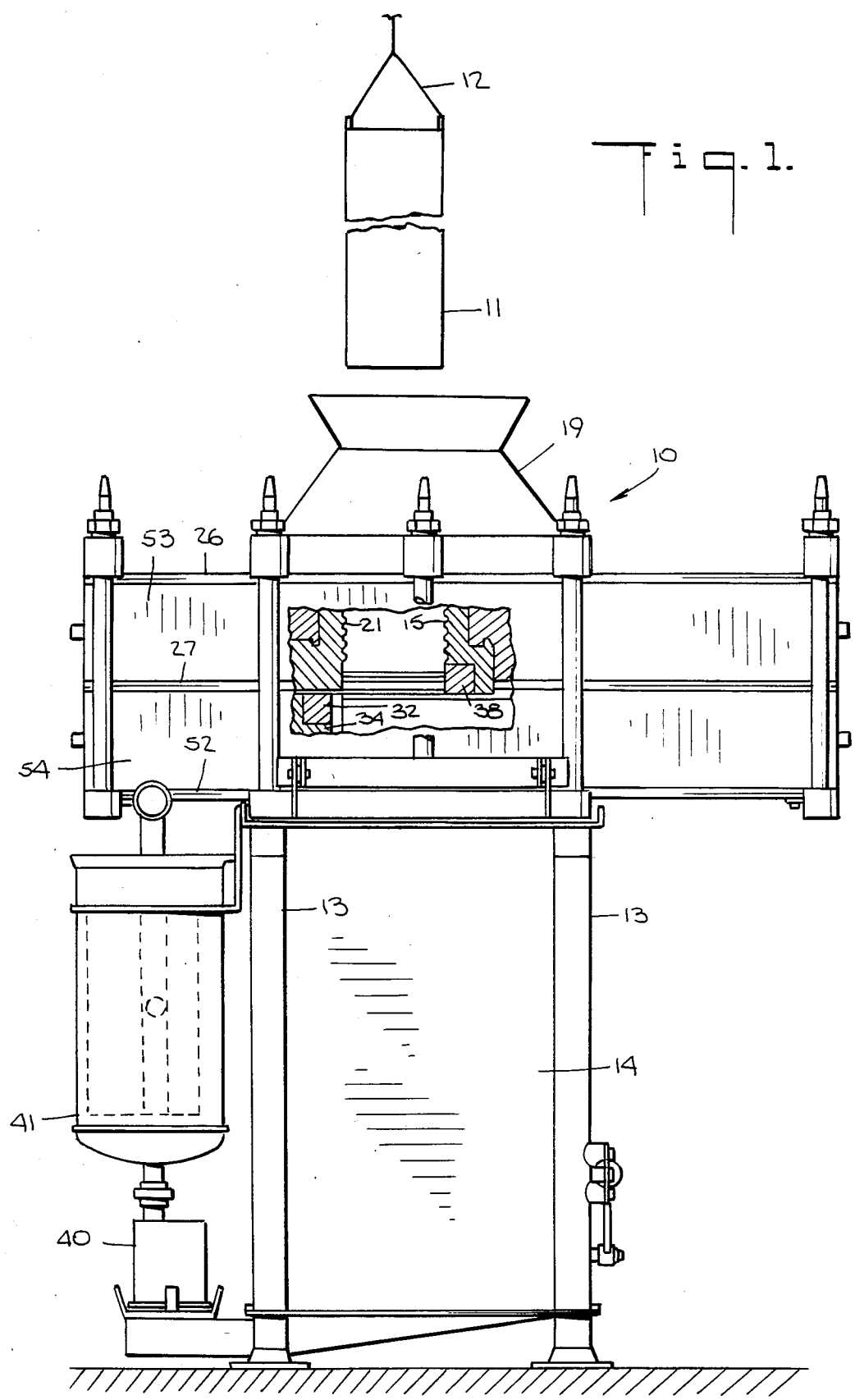
FIG. 1 is a front elevational view, partly broken away and partly in section, of underwater compressing and cutting apparatus constructed in accordance with the invention, together with a fragmentary diagrammatic view of activated or contaminated components of a core of a nuclear reactor being lowered into the apparatus.

Referring now more particularly to FIG. 1 of the drawings, there is represented in front elevational view of underwater compressing and cutting apparatus 10 for activated or contaminated components 11 of the core of a nuclear reactor. The components 11 are suspended above the apparatus 10 by a suitable cable 12. The apparatus 10 is located in a water basin (not shown) and comprises a frame 13 preferably made of stainless steel and preferably encased with stainless steel sheet forming a shroud 14. The apparatus 10 can be remotely operated from above water.

Figure 3:
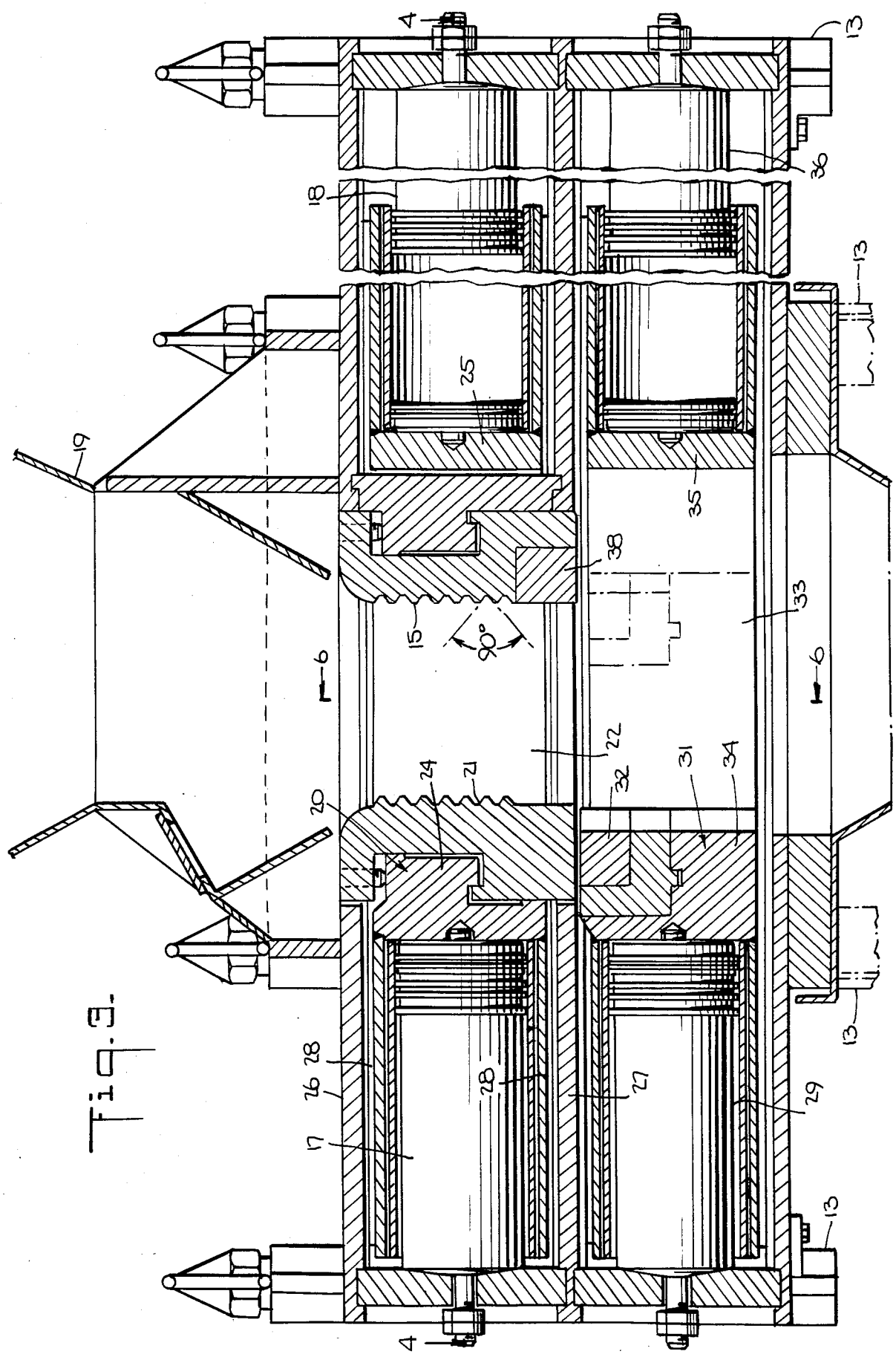
FIG. 3 is a fragmentary, sectional view, to an enlarged scale, of a compressing and cutting portion of the FIG. 1 apparatus.
Figure 4:
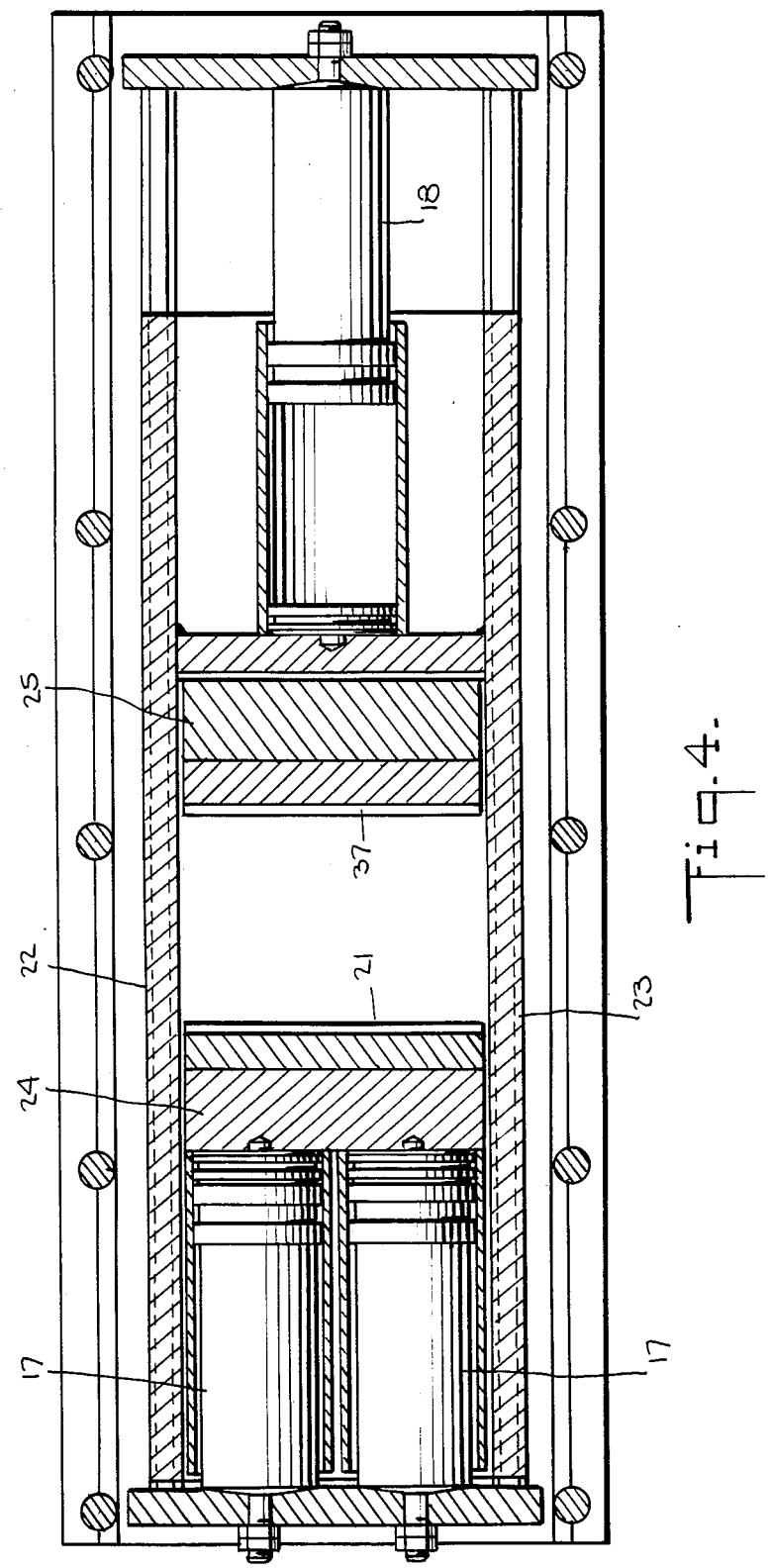
FIG. 4 is a plan view, to an enlarged scale and partly in section, taken along line 4—4 of FIG. 3, of a portion of the FIG. 1 apparatus in one operating condition.
Figure 5:
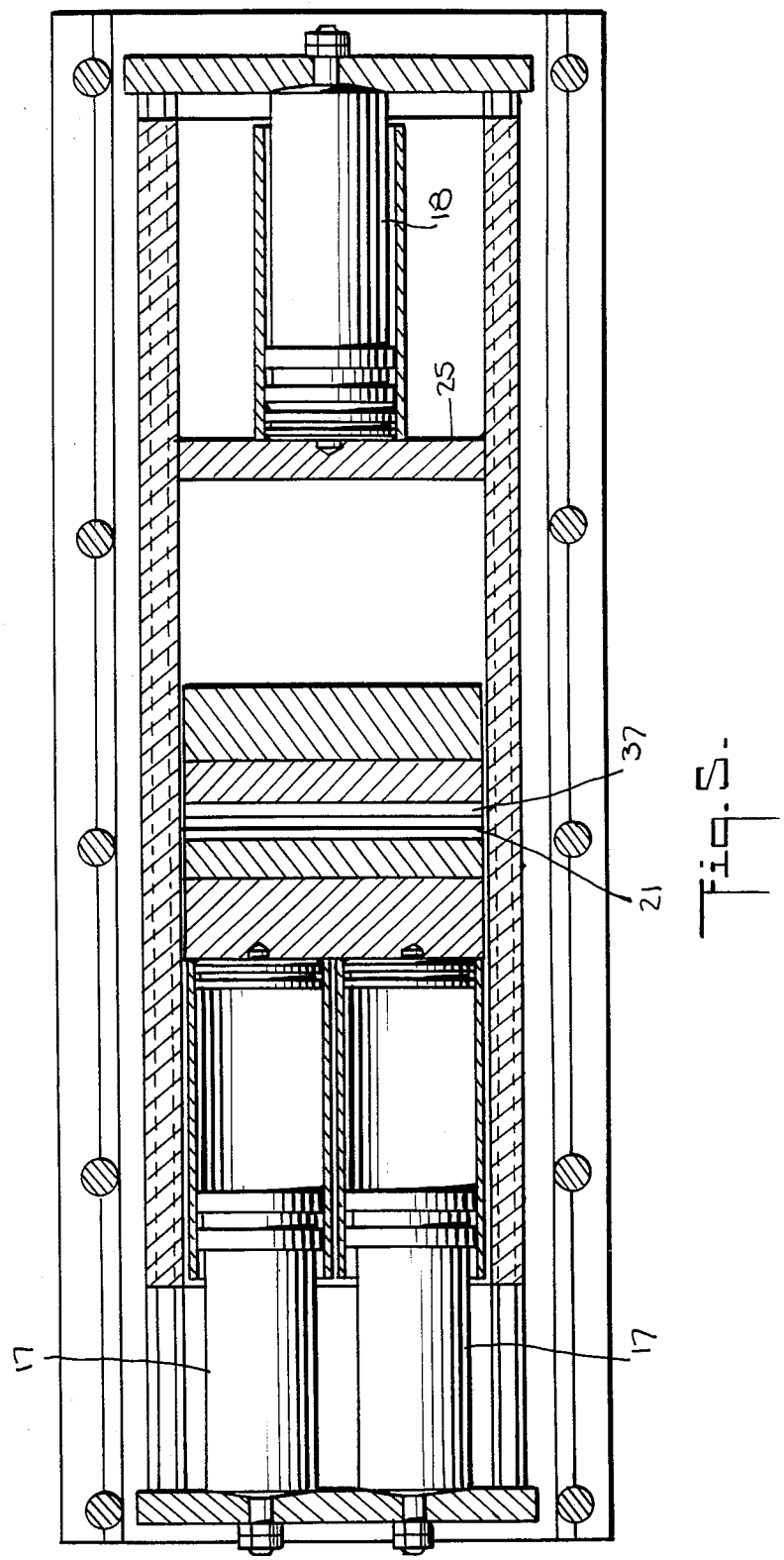
FIG. 5 is a plan view, partly in section, of the FIG. 4 portion of the FIG. 1 apparatus in another operating condition.

The apparatus includes first squeezing means 15 attached to the frame 13. The apparatus also includes first controllable displacing means attached to the frame 13. Referring also to FIGS. 3, 4 and 5, the first controllable displacing means comprises unidirectional hydraulic cylinder drive means 17 and unidirectional hydraulic cylinder drive means 18. The apparatus also includes a guide funnel 19. The pistons of the cylinder drive means 17, 18 are attached to the frame 13 and the associated cylinders are displaceable.

Figure 6:
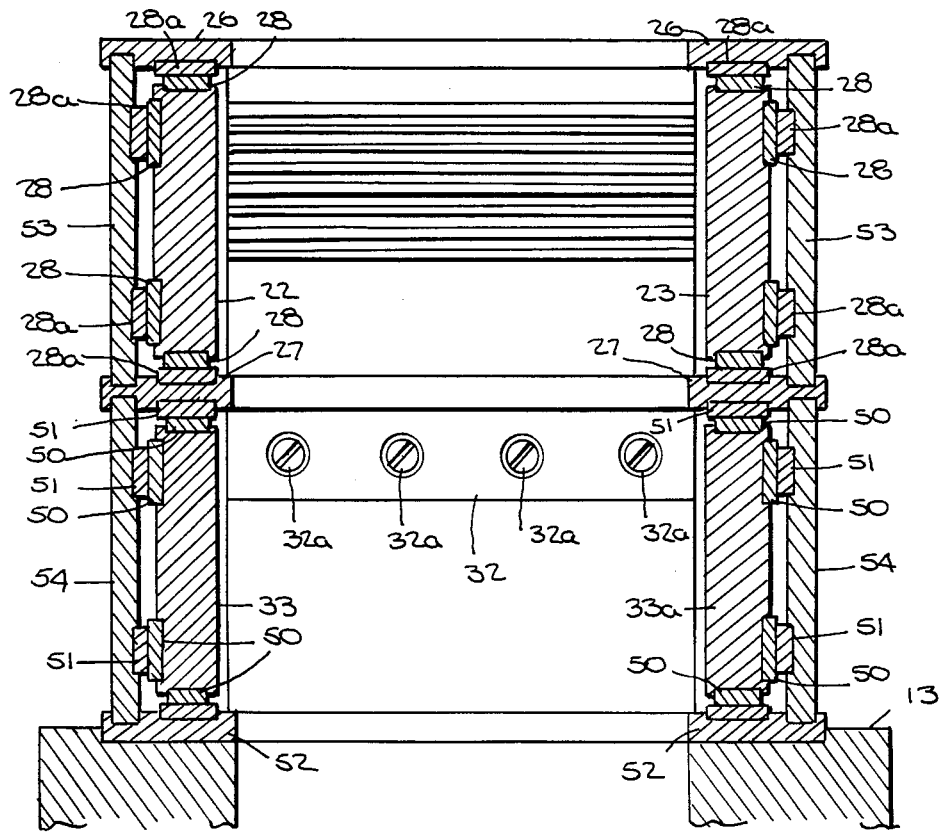
FIG. 6 is a sectional view of a portion of the FIG. 3 apparatus taken along line 6—6 of FIG. 3.

Referring to FIGS. 3, 4 and 6, the apparatus includes a first assembly 20 that is movable by the controllable displacing means 17 and comprises second squeezing means 21 and means supporting the second squeezing means and slidable on the frame 13 and having vertically extending, horizontally spaced sliding means or plates 22, 23 joined by transversely extending means, preferably horizontal bars 24, 25. The transversely extending means 24, 25 is displaceable by the controllable displacing means 17, 18 for displacing the slidable means, comprising plates 22, 23, and the second squeezing means 21 in two directions on the frame 13 to compress and release the core components.

Referring now to FIG. 3, the frame 13 preferably comprises a first horizontal removable member or plate 26 above and in contact with the vertically extending, horizontally spaced sliding means 22, 23 of the first assembly 20. The frame 13 also preferably comprises a second horizontal removable member or plate 27 below and supporting the vertically extending, horizontally spaced sliding means 22, 23 of the first assembly 20. These plates 26, 27 can be disassembled under water.

Referring to FIG. 6, the means supporting the second squeezing means 21 and slidable on the frame 13 preferably has Stellite (a trademark) bearing strips 28 comprising a cobalt-chromium-tungsten alloy. The frame 13, including removable side plates 53, preferably has Stellite bearing strips 28a.

Referring now to FIGS. 1, 3 and 6, the apparatus also includes second controllable displacing means attached to the frame 13. The second controllable displacing means comprises unidirectional hydraulic cylinder drive means 29 and unidirectional hydraulic cylinder drive means 36. The apparatus also includes a second assembly 31 which is separately movable by the second controllable displacing means 29, 36. The second assembly 31 comprises a knife 32 and means supporting the knife 32 slidable on the frame 14 and having vertically extending, horizontally spaced sliding means or plates 33, 33a joined by transversely extending means, preferably horizontal bars 34, 35. The transverse horizontally extending means 34, 35 of the second assembly is displaceable by the second controllable displacing means 29, 36 for displacing the second slidable means, comprising plates 33, 33a, and the knife 32 together in two directions on the frame to cut the core components. The second controllable displacing means 29, 36 preferably comprises unidirectional cylinder drive means 29 including two cylinders disposed side-by-side in a manner similar to the cylinders of the cylinder drive means 17 of FIG. 4. The second controllable displacing means 29, 36 also preferably comprises a unidirectional cylinder drive means 36 including a cylinder disposed in a manner similar to the cylinder drive means 18 of FIG. 4. As represented in FIG. 6, the plates 33, 33a preferably have Stellite bearing strips 50 and the frame 13, including removable side plates 54, preferably has Stellite bearing strips 51. A bottom plate 52 is removably attached to the frame 13. Bolts 32a through the knife 32 attach the knife 32 to the transverse means 34.

All of the unidirectional cylinder drive means preferably are extendable under hydraulic pressure. The hydraulic fluid preferably is demineralized water, thereby avoiding contamination of the pool with hydraulic oil.

The first and second squeezing means preferably comprise hardened corrugated jaws 21, 15 having mating corrugations. The corrugated jaws 21, 15 preferably have trapezoidal corrugations in which opposed sides of adjacent trapezoids are disposed at an angle of 90° relative to each other as represented in FIG. 1 to crimp and sharply bend the core components and prevent, for example, 70 per cent of any spring-back after compacting by minimizing resilience of the core components. The squeezing means 21, 15 are replaceable and the knife 32 and the stationary knife 38 preferably also are replaceable. The corrugated jaws preferably comprise a hardened stainless steel to resist contamination by embedded radioactive particles. The set of corrugated jaws 21, 15 preferably are interchangeable with a set of flat jaws.

For the purpose of keeping the pool water clean, the frame 13 is shrouded by sheets 14. Pool water is drawn into the shroud through the guiding hopper portion 19 (FIG. 1) by a suction pump 40 with a filter 41 with elements which are replaceable under water for aspirating, filtering and recirculating the pool water.

Figure 2:
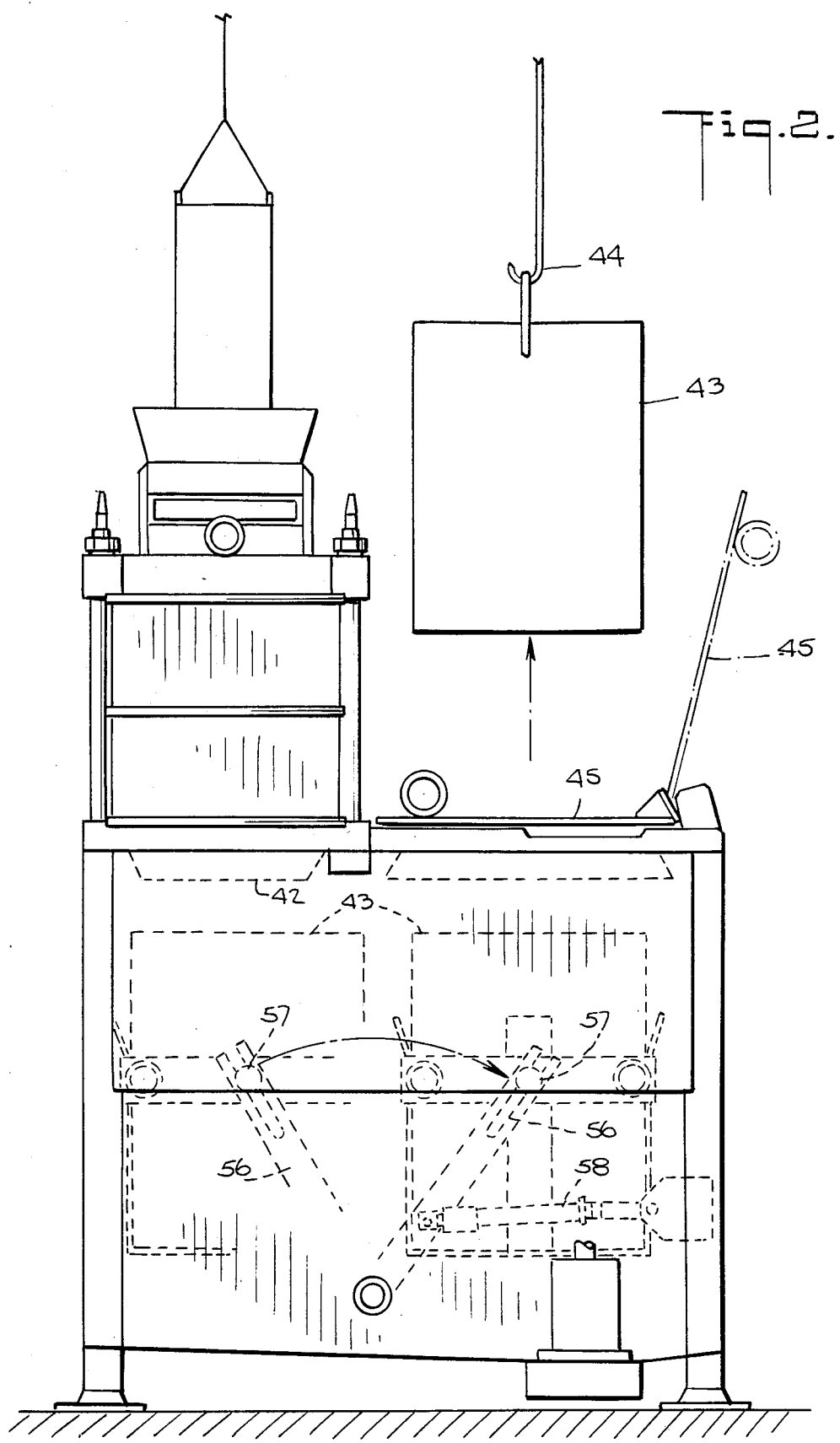
FIG. 2 is a side elevational view of the FIG. 1 apparatus, representing the core components being lowered into the apparatus and a transfer container being removed from the apparatus.

As represented in FIG. 2, a collecting funnel 42, represented in broken-line construction, preferably is disposed under the cutting knife 32 to guide the chopped pieces of the core components into a transfer container 43, represented in two alternate positions in broken-line construction and positioned by a suitable lever 56 and pin 57 drive mechanism under the control of a cylinder 58, also represented in broken-line construction. The transfer container 43 is represented in solid-line construction as withdrawn by a suitable lifting tool 44 through an opening of the apparatus which may be covered by a lid 45.

Considering now the operation of the FIG. 1 apparatus with reference to FIGS. 4, 5 and 7-10, inclusive, FIG. 4 represents the corrugated jaws 21, 15 in a fully open position with the cylinder drive means 17 retracted and the cylinder drive means 18 having its piston extended. FIG. 5 represents the jaws 21, 15 in a fully closed position with the cylinder drive means 17 having their pistons extended and the cylinder drive means 18 retracted. The unidirectionally acting cylinder drive means 17 are, therefore, effective to close the jaw 21 against the jaw 15, moving the vertical sled members 22, 23 on the Stellite strips 28 in a sliding manner toward the position represented in FIG. 5. The unidirectionally acting cylinder drive means 18 is effective to open the jaws 21, 15, moving the sled assembly 22, 23, 24, 25 to the position represented in FIG. 4.

The knife 32 and its sled assembly 31, 33a, 34, 35 are displaced in a similar manner by the cylinder drive means 29 and 36.

Figure 7:
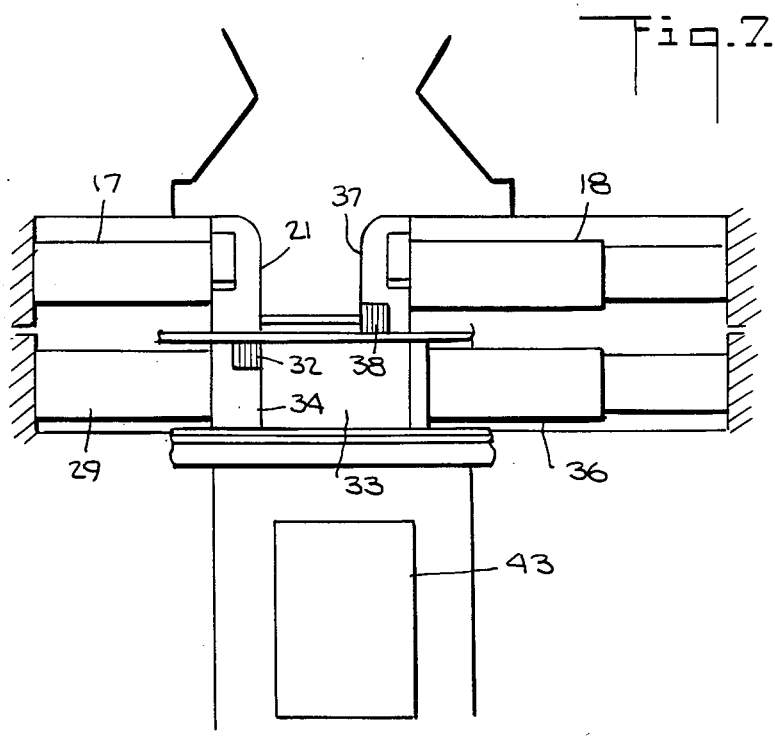

Referring to the schematic representation of FIG. 7, the jaws 21 and 15 are represented in their fully open position with the cylinder drive means 17 retracted and the cylinder drive means 18 having its piston extended. The knife 32 is also represented in its open position with respect to the stationary knife 38, with the cylinder drive means 29 retracted and the cylinder drive means 36 having its piston extended, thereby positioning the sled 33, 33a, 34, 35 to the open position.

Referring now more particularly to FIG. 8, the core components 11 have been lowered into the apparatus in two compressing steps. The first compressing step (not shown) compacted, crushed and crimped the lower portion of the core components 11. The second compressing step is represented in FIG. 8, with the cylinder drive means 17 extended to squeeze the core components between corrugated jaws 21 and 15 to compact, crush, and crimp the core components. The cylinder drive means 18 is retracted due to the movement of the sled 22, 23, 24, 25.

Referring now to FIG. 9, while the jaws 21 and 15 maintain their compacting force against the components 11, the knife 32 is driven against the core components 11 by the cylinder drive means 29. The cylinder drive means 36 is then partially retracted due to the movement of the sled 33, 33a, 34, 35.

Referring now to FIG. 10, the cylinder drive means 29 is fully extended to cut the core components 11 with a piece dropping into the transfer container 43. The cylinder drive means 36 is fully retracted. The knife 32 may be opened by extension of the cylinder drive means 36, and thereafter the jaw 21 may be opened by extension of the cylinder drive means 18 to allow the core components 11 to be lowered further by the cable 12 (FIG. 1) for the compacting and cutting of another section of the core components.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. Underwater compressing and cutting apparatus for activated or contaminated components of the core of a nuclear reactor comprising:
   a frame;
   first squeezing means attached to said frame;
   first controllable displacing means attached to said frame;
   a first assembly that is movable by said controllable displacing means and comprising second squeezing means and sled means supporting said second squeezing means and slidable on said frame and having vertically extending, horizontally spaced sliding means joined by transversely extending means, said tranversely extending means being displaceable by said controllable displacing means for displacing said slidable means and said second squeezing means together in two directions on said frame to compress and release the core components;
   said frame comprising a first horizontal removable member above and in contact with said vertically extending, horizontally spaced sliding means of said first assembly;
   said frame also comprising a second horizontal removable member below and supporting said vertically extending, horizontally spaced sliding means of said first assembly; and
   said frame also comprising removable vertical side members between said horizontal members and having surfaces against which said sled means slides;
   second controllable displacing means attached to said frame;
   a second assembly which is separately movable by said second controllable displacing means, and said second assembly comprising a knife and sled mean supporting said knife slidable on said frame and having vertically extending, horizontally spaced sliding means joined by transversely extending means, said transversely extending means of said second assembly being displaceable by said second controllable displacing means for displacing said second slidable means and said knife together in two directions on said frame to cut the core components.

2. Apparatus in accordance with claim 1, which can be disassembled under water.

3. Apparatus in accordance with claim 1, in which said means supporting said second squeezing means and slidable on said frame has bearing strips comprising cobalt-chromium-tungsten alloy.

4. Apparatus in accordance with claim 1, in which said first controllable displacing means comprises a pair of opposed unidirectional hydraulic cylinder drive means.

5. Apparatus in accordance with claim 4, in which said second controllable displacing means comprises a pair of opposed unidirectional hydraulic cylinder drive means.

6. Apparatus in accordance with claim 5, in which the fluid for said hydraulic cylinder drive means is demineralized water.

7. Apparatus in accordance with claim 1, in which said first and second squeezing means comprise interchangeable jaws, and one set of two jaws are corrugated with mating corrugations to crimp the workpiece and prevent spring-back.

8. Apparatus in accordance with claim 1, in which said first and second squeezing means comprise corrugated jaws having mating corrugations to crimp the workpiece and prevent spring-back.

9. Apparatus in accordance with claim 8, in which said corrugated jaws have trapezoidal corrugations.

10. Apparatus in accordance with claim 9, in which opposed sides of adjacent trapezoids are disposed at an angle of 90° relative to each other.

11. Apparatus in accordance with claim 1, in which said squeezing means are replaceable under water.

12. Apparatus in accordance with claim 1, in which said knife is replaceable.

13. Apparatus in accordance with claim 1, which includes a filter which is replaceable under water.

14. Apparatus in accordance with claim 1, which can be remotely operated from above water.

* * * * *